(No Model.)
L. S. WEAVER.
PROCESS OF PREPARING SURGICAL SUTURES.
No. 505,148. Patented Sept. 19, 1893.
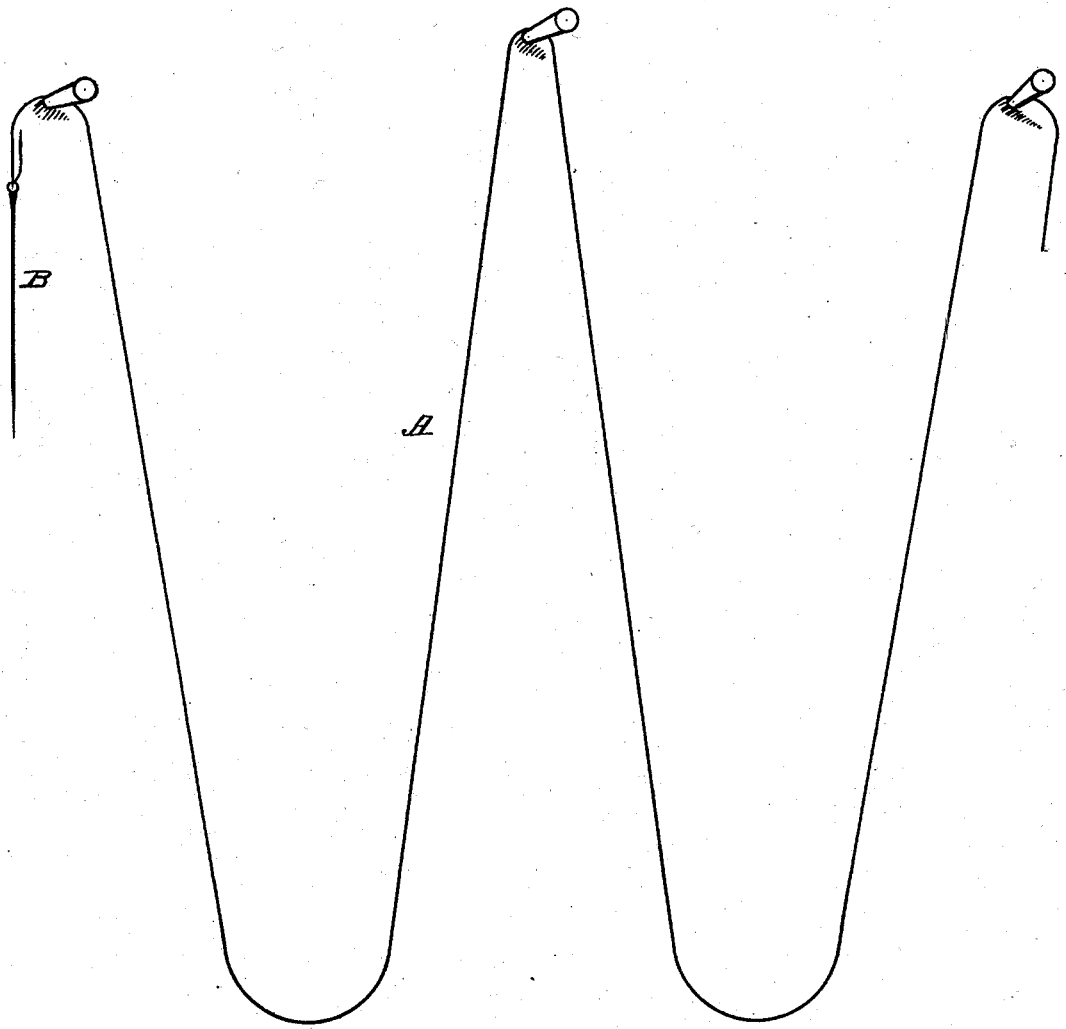
WITNESSES
Jas. B. Clarke
M. M. Mason
INVENTOR.
L. S. Weaver
by E. H. Bates, Attorney.

UNITED STATES PATENT OFFICE.

LELAND S. WEAVER, OF FREMONT, MICHIGAN.

PROCESS OF PREPARING SURGICAL SUTURES.

SPECIFICATION forming part of Letters Patent No. 505,148, dated September 19, 1893.

Application filed July 11, 1893. Serial No. 480,149. (No specimens.)

*To all whom it may concern:*

Be it known that I, LELAND S. WEAVER, a citizen of the United States, residing at Fremont, in the county of Newaygo and State of Michigan, have invented certain new and useful Improvements in Processes of Preparing Surgical Sutures; and I do hereby declare the following to be a full, clear, and exact description of the invention, such as will enable others skilled in the art to which it appertains to make and use the same.

My invention relates to aseptic shredded animal tendon designed for all sutures and ligatures in surgery, and it consists in the processes hereinafter more fully described and particularly pointed out in the claims.

In the drawing the figure represents my improved surgical ligature, of which—

A, designates the ligature ready for use and B indicates a needle, to the eye of which the ligature is threaded.

My mode of preparing this aseptic shredded animal tendon is as follows: I first take the tendons (or cords) from healthy beeves or other animals and place them in a sealed package—glass being preferred—containing a solution of chloride of sodium (salt) for twenty four hours; secondly, I take the tendons from this solution and cut all sheaths and flesh away. After the tendons have become partially dried I carefully split them at right angles through their centers at equidistant points from their ends, making four strands drawn into four parts. These parts are again, and again, subdivided in a similar manner, until they are reduced to the proper size desired. If after these steps in the process they are interlocked and refractory they are dried hard and hammered and twisted until the shreds are loosened, and if then not shredable they are immersed in strong saponaceous compound (soap suds) and then shredded to the desired fineness. The tendons now shredded are put into pure alcohol containing disinfectants (boracic acid, bichloride of mercury, &c.,) to render them perfectly aseptic. They are next taken and put into clarifying solution consisting of twelve per cent. glycerine water. They are then twisted and made tense while drying, thus rendering them transparent. Where from any cause the tendons are not wanted to absorb or vitalize but to remain longer in the tissue, than ten or twelve days, tannic acid is added to the alcoholic solution to tan and toughen the tendon fiber. In this process after tanning, the tendons are dipped in a weak solution of chloride of iron to blacken them; making a fine distinction of the vitalized and the non-vitalizing kind, they are then treated with the weak glycerine as before, to clarify.

A third or further step in the method or process is to dry the shredded tendon, rehammer it and put it through the process of carding to reduce it to the condition of wool or cotton fiber, and then spin it into threads for surgical and other purposes desired.

Having thus fully described my invention, what I claim, and desire to secure by Letters Patent, is—

1. The herein described method of preparing aseptic shredded animal tendon for sutures and ligatures in surgery, consisting in taking tendons from healthy beeves or other animals and placing in a solution of chloride of sodium, then taking them from this solution and cutting sheaths and flesh away, partially drying said tendons and splitting them at right angles through their centers, and dividing the strands thus formed until reduced to the size desired, and hammering and twisting the same until the shreds are loosened, as set forth.

2. The herein described method of preparing aseptic shredded animal tendon for sutures and ligatures in surgery, consisting in taking tendons from beeves or other animals and placing in a solution of chloride of sodium then taking them from this solution and cutting sheaths and flesh away, then dipping them in a weak solution of chloride of iron, then drying and rehammering the tendons, then carding and spinning into threads for surgical and other purposes, as set forth.

3. A surgical ligature of spun or twisted strands of animal tendons, previously treated with chloride of iron and hammered, as and for the purpose herein set forth.

In testimony whereof I affix my signature in presence of two witnesses.

LELAND S. WEAVER.

Witnesses:
A. O. WHITE,
SARAH A. WATERS.